(12) United States Patent
Kumai et al.

(10) Patent No.: US 6,257,590 B1
(45) Date of Patent: Jul. 10, 2001

(54) SEALING STRUCTURE AND METHOD OF MOUNTING PISTON RING STRUCTURAL BODY FOR USE IN THE SEALING STUCTURE

(75) Inventors: Teruo Kumai, Nishikamo-gun; Yoshihiko Masuda, Okazaki; Michio Okamoto, Kami-ina, all of (JP)

(73) Assignees: Toyota Jidosha Kabushiki Kaisha, Toyota; Teikoku Piston Ring Co., Ltd., Tokyo, both of (JP)

(*) Notice: Subject to any disclaimer, the term of this patent is extended or adjusted under 35 U.S.C. 154(b) by 0 days.

(21) Appl. No.: 09/244,848

(22) Filed: Feb. 4, 1999

(30) Foreign Application Priority Data

Feb. 20, 1998 (JP) .................................. 10-039264
Jun. 1, 1998 (JP) .................................. 10-151568
Aug. 25, 1998 (JP) .................................. 10-238940

(51) Int. Cl.⁷ ....................................... F16J 9/16
(52) U.S. Cl. .................... 277/435; 277/448; 277/460; 29/888.07
(58) Field of Search .................. 277/435, 442, 277/443, 448, 460; 29/888.07

(56) References Cited

U.S. PATENT DOCUMENTS 3,806,137  4/1974  Prasse et al. .................. 277/205
5,743,536 * 4/1998  Komuro et al. .................. 277/435
5,988,649 * 11/1999 Van Ryper et al. .................. 277/435

FOREIGN PATENT DOCUMENTS

| 33 25 015 | 8/1984 | (DE) . |
| 0 351 549 | 1/1990 | (EP) . |
| 0 396 775 | 11/1990 | (EP) . |
| 1 368 597 | 10/1974 | (GB) . |
| 57-148036 | 9/1982 | (JP) . |
| 8-226542  | 9/1996 | (JP) . |
| 9-280373  | 10/1997 | (JP) . |

* cited by examiner

*Primary Examiner*—Chuck Y. Mah
*Assistant Examiner*—Enoch E Peavey
(74) *Attorney, Agent, or Firm*—Pillsbury Winthrop LLP (57) ABSTRACT

The present invention provides a sealing structure employing a piston ring structural body of a type wherein an outer ring continuously formed of a resinous material is pressed radially outwards by a metal coil expander via a metal inner ring provided with an abutment. The piston ring structural body has a construction wherein the outer ring continuously formed of polyimide is pressed radially outwards by the coil expander via the steel inner ring provided with the abutment. A sliding face of the outer ring, which slides on a cylinder wall, is divided by a groove into upper and lower sliding faces, whose respective upper edge portions are provided with chamfers.

15 Claims, 10 Drawing Sheets

SEALING STRUCTURE AND METHOD OF MOUNTING PISTON RING STRUCTURAL BODY FOR USE IN THE SEALING STUCTURE

INCORPORATION BY REFERENCE

The disclosed contents of Japanese Patent Applications Nos. HEI 10-39264 filed on Feb. 20, 1998, HEI 10-151568 filed on Jun. 1,1998, and HEI 10-238940 filed on Aug. 25, 1998 including the specifications, drawings and abstracts are incorporated herein by reference in their entirety.

BACKGROUND OF THE INVENTION

1. Field of the Invention

The present invention relates to a sealing structure for sealing a space between a piston and a cylinder that are in sliding contact with each other and, more particularly, relates to a sealing structure in the form of a piston ring for an internal combustion engine wherein an outer ring made of a resinous material is pressed toward a sliding face by urging means via an inner ring. The present invention also relates to a method of mounting a piston ring structural body for use in the sealing structure.

2. Description of the Related Art

A sealing structure is widely employed to seal a space between a piston and a cylinder that are in sliding contact with each other.

For example, an internal combustion engine has a so-called piston ring disposed within a piston ring groove. Conventionally, in many cases, this piston ring is made of a metal. However, a resinous piston ring has also been developed.

For example, Japanese Patent Application Laid-Open No. HEI 9-280373 discloses usage of a resinous piston ring. In this publication, there is disclosed a piston ring structural body wherein an outer ring that is continuously formed of polytetrafluoroethylene (PTFE) as a fluororesin without being provided with an abutment is pressed radially outwards by a ring tensile force applying member composed of a metal coil expander via an inner ring that is also continuously formed of PTFE without being provided with an abutment.

In the piston ring structural body disclosed in the aforementioned publication, the ring is divided into the inner and outer rings. While the inner ring ensures sealability around a ring groove, the outer ring ensures sealability between a sliding portion thereof and a cylinder wall.

It is to be noted herein that the piston ring structural body disclosed in the aforementioned publication uses PTFE for both the inner and outer rings. However, PTFE has a low threshold value of PV (a product of a real pressure P and sliding speed V) and cannot provide the sliding portion that slides on the cylinder wall with sufficient durability. Furthermore, PTFE has a large coefficient of thermal expansion. Thus, when the temperature rises, the pressing force applied to the cylinder wall due to an elastic force of the coil expander becomes larger and increases a frictional loss of the engine, which raises a serious problem in relation to the outer ring.

Furthermore, when the temperature rises during operation of the engine, the coil expander cuts into the inner ring and causes permanent distortion. This results in a problem, for example, of deterioration in the sealability around the ring groove.

SUMMARY OF THE INVENTION

In view of the aforementioned problems, it is an object of the present invention to enhance durability of a sealing structure wherein a resinous sliding-contact ring is pressed against one of opposed sliding faces of a piston and a cylinder by urging means via an urging force receiving ring.

It is another object of the present invention to provide a method of mounting a piston ring structural body for use in such a sealing structure to a piston easily and reliably.

A first aspect of the present invention provides a sealing structure that is disposed in a groove formed in one of opposed sliding faces of a piston and a cylinder that are in sliding contact with each other and is urged toward and brought into sliding contact with the other sliding face where no groove is formed. This sealing structure includes a sealing member composed of a plurality of radially laminated rings and urging means for urging the sealing member toward a side where no groove is formed. A sliding-contact ring of the sealing member is disposed on a side most remote from the urging means and contains the aforementioned sliding-contact face. This sliding-contact ring is made of polyimide resin. An urging force receiving ring of the sealing member is adjacent to the urging means and receives an urging force from the urging means. This urging force receiving ring is provided with an abutment and made of a material that has a hardness equal to or greater than polyimide resin.

In the thus-constructed sealing structure, the sliding-contact ring is made of polyimide resin, and the urging force receiving ring is provided with an abutment and made of a material that is as hard as or harder than polyimide resin. Therefore, both the sliding-contact face and the urging force receiving face exhibit high durability.

In addition to the features of the first aspect of the present invention, the present invention may further be specified according to a second aspect thereof. That is, the aforementioned sealing structure is a piston ring disposed within a piston ring groove formed in a piston for an internal combustion engine, and the sealing member is a double-structure ring composed of an outer ring serving as the sliding-contact ring disposed on the side closest to the cylinder and an inner ring serving as the urging force receiving ring disposed on the side closest to the piston.

In the thus-constructed sealing structure, the outer ring, which is disposed within the piston ring groove as the piston ring and made of polyimide resin, is pressed against the cylinder by the urging means via the inner ring.

In the second aspect of the present invention, the aforementioned outer ring can be continuously formed without being provided with an abutment.

In the thus-constructed piston ring structural body, the outer ring continuously formed of polyimide without being provided with an abutment is pressed against the cylinder by the urging means via the inner ring.

In the second aspect of the present invention, the aforementioned outer ring can also be provided with an abutment.

In the thus-constructed piston ring structural body, the outer ring made of polyimide and provided with an abutment is pressed against the cylinder by the urging means via the inner ring.

In addition, the abutment of the outer ring may be an inclined abutment that has been formed by cutting the outer ring when the outer ring is in the shape of a perfectly round circle at a room temperature. Also, the width of the outer ring in a piston-axis direction during operation can be set smaller than the width of a groove of the piston in the piston-axis direction during operation.

In the thus-constructed sealing structure, the outer ring having the inclined abutment, which has been formed by cutting the outer ring when the outer ring is in the shape of a perfectly round circle at a room temperature, is pressed against the cylinder by the urging means via the inner ring. When the outer ring thermally expands during operation, opposed end faces of the inclined abutment are displaced relative to each other.

Furthermore, in the second aspect of the present invention, the width of the outer ring in the piston-axis direction during operation can be set smaller than the width of the inner ring in the piston-axis direction during operation, and the width of the inner ring in the piston-axis direction during operation can be set smaller than the width of a ring groove of the piston in the piston-axis direction during operation.

In the thus-constructed sealing structure, the inner ring moves in a piston-axis direction in accordance with the movement of the outer ring in the piston-axis direction. Accordingly, the inner ring first hits top and bottom faces of a piston groove, whereby the outer ring is inhibited from being abraded.

In the second aspect of the present invention, at least a lower face of the outer ring may be coated with titanium nitride, chrome nitride or diamond-like carbon.

In the thus-constructed sealing structure, the lower face of the outer ring of the piston ring structural body, which has a construction wherein the outer ring made of polyimide is pressed against the cylinder by the urging means via the inner ring, is reinforced by being coated with titanium nitride (TiN), chrome nitride (CrN) or diamond-like carbon (DLC). Accordingly, the lower face of the outer ring is inhibited from being abraded despite contact with the ring groove, which occurs in accordance with the movement of the piston in the piston-axis direction.

In addition, in the second aspect of the present invention, an outer sliding face of the outer ring may be divided in the top-to-bottom direction, and at least an upper edge of a sliding face that is closest to a top position may be provided with a chamfer.

In the thus-constructed sealing structure, the sliding face of the outer ring of the sealing structure, which has a construction wherein the outer ring made of polyimide is pressed against the cylinder by the urging means via the inner ring, slides on the cylinder wall and is divided in the top-to-bottom direction. Thereby, the entire cross-section of the outer ring is prevented from being displaced, and the outer ring is inhibited from changing its posture relative to the cylinder wall. Furthermore, the provision of a chamfer at an upper edge portion of the upper sliding face reduces the amount of oil raked upwards by the piston during an upward movement thereof and inhibits oil loss.

In the second aspect of the present invention, the inner ring may be made of a metal, and the urging means may be a coil expander, which is a member composed of a metal wire wound like a coil.

The thus-constructed sealing structure is fitted into the piston ring groove as the piston ring, and the outer ring made of polyimide resin is pressed against the cylinder by the coil expander via the metal inner ring.

Furthermore, in the second aspect of the present invention, the inner ring may be made of a reinforced polyimide resin, and the urging means may be a coil expander, which is a member composed of a metal wire wound like a coil.

A third aspect of the present invention provides a method of mounting the piston ring structural body of the second aspect of the present invention. This method is composed of first through fourth steps. In the first step, urging means is fitted into a piston ring groove. In the second step, the piston is covered from a top side thereof with a ring guide having a truncated cone portion that is enlarged toward a cylindrical portion adapted to an outer circumference of the piston, such that a lower end of the cylindrical portion is located close to a center of a land that is located immediately above the piston ring groove. In the third step, the inner ring is fitted into the piston ring groove using the truncated cone portion of the ring guide. In the fourth step, the outer ring, which is continuously formed of polyimide without being provided with an abutment, is fitted into the piston ring groove, using the truncated cone portion of the ring guide, in a state where the inner ring thus-fitted into the piston ring groove and pressed radially outwards by the urging means is pressed radially inwards by an inner ring pressing jig so as to prevent an outermost portion of the inner ring from projecting from the piston ring groove.

This mounting method makes it possible to fit the piston ring structural body, which has a construction wherein the outer ring made of polyimide resin, especially the outer ring continuously formed without being provided with an abutment is pressed outwards in the radial direction of the piston by the urging means via the inner ring, into the ring groove easily and reliably.

In the third aspect of the present invention, the inner ring pressing jig may be provided with a pressing portion for pressing the inner ring radially inwards and a fit portion that is fitted into another ring groove to be positioned therein.

The thus-constructed method of mounting the piston ring structural body ensures that the inner ring pressing jig forces the inner ring into the ring groove easily and reliably, which leads to a substantial enhancement in workability.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF THE PREFERRED EMBODIMENTS

Embodiments of the present invention will be described hereinafter with reference to the accompanying drawings.

Figure 1:
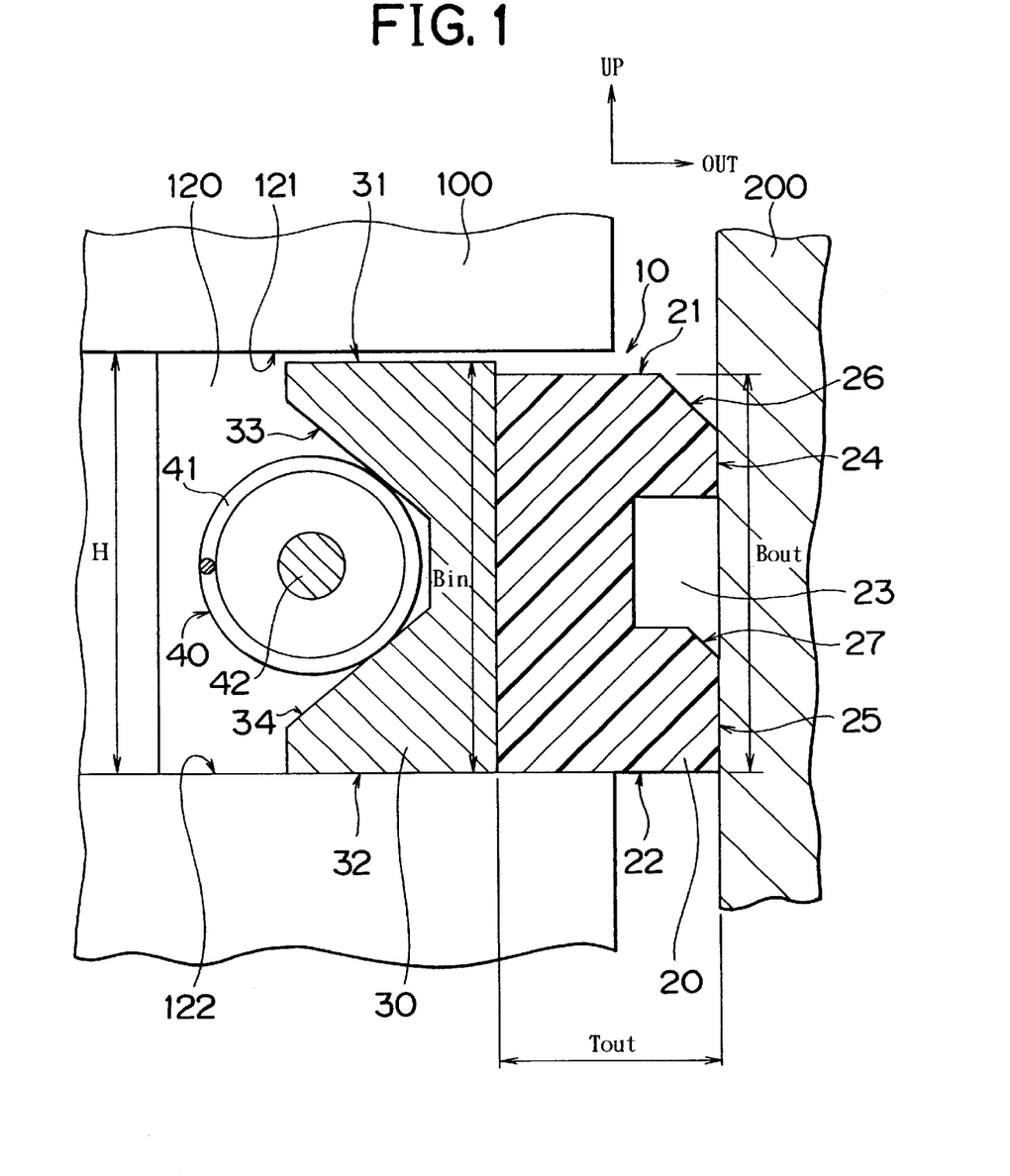
FIG. 1 shows a sealing structure according to a first embodiment of the present invention.

FIG. 1 shows a sealing structure employing a second ring of a piston according to a first embodiment of the present invention. Referring to FIG. 1, a ring groove 120 is formed in a piston 100, which slides on a cylinder wall 200. The ring groove 120 is a second ring groove, which is located at the second closest position to a top portion (not shown) of the piston 100.

A piston ring structural body 10 is fitted into the ring groove 120. The piston ring structural body 10 is composed of an outer ring 20, an inner ring 30 and a coil expander 40, which are arranged in that order in a radially outside-to-inside direction. It is to be noted in FIG. 1 that arrow UP indicates an upward direction of the piston 100 and that arrow OUT indicates a radially outward direction of the piston 100.

The outer ring 20 is made of polyimide and has a coefficient of thermal expansion of $3 \times 10^{-5}$/K or less and a breaking point breaking point (a ratio of an elongation of a test piece that has been fracture to the original length thereof in a tensile test) of 10% (10% of the original length) or more.

The height $B_{out}$ of the outer ring 20 in a piston-axis direction during operation is set smaller than the height $B_{in}$ of the inner ring 30 in the piston-axis direction during operation.

A sliding face between the outer ring 20 and the radially outside cylinder wall 200 is divided into an upper sliding face 24 and a lower sliding face 25 by a groove 23 continuously extending along the outer circumference. Because the sliding face is thus divided into the upper sliding face 24 and the lower sliding face 25, the outer ring 20 can slide in a stable posture against the cylinder wall 200, despite a relatively small radial width $T_{out}$ of the outer ring 20.

The upper and lower sliding faces 24, 25 are provided with chamfers 26, 27 at respective upper edge portions thereof. The provision of the chamfers 26, 27 reduces the amount of oil film raked upwards by the piston 100 during an upward movement thereof and inhibits what is called oil loss.

As shown in FIG. 1, the groove 23 of the outer ring 20 is formed at a location higher than the axial thickness center of the outer ring 20 by a predetermined distance (on the side of the combustion chamber when mounting the piston). The chamfer 26 formed at the upper end of the upper sliding face 24 is larger than the chamfer 27 formed at the upper end of the lower sliding face 25. Owing to such a construction, when the piston slides within the cylinder towards the combustion chamber, the large chamfer 26 of the upper sliding face 24 appropriately rakes oil on the cylinder wall surface so as to form a homogeneous oil film, and the chamfer of the lower sliding face 25 is designed to maintain the thus-formed oil film without causing disorder thereto. Consequently, the oil film can be stabilized within the cylinder. Furthermore, since the upper sliding face 24 has a smaller sliding area than the lower sliding face 25", the areal pressure applied to the upper sliding face 24 by the pressing force of the coil expander is higher than that applied to the lower sliding face 25. However, oil generates a dynamic pressure when flowing onto the sliding face, whereby it becomes possible to prevent the upper sliding face 24 from being abraded excessively. On the other hand, the lower sliding face 25 is wider than the upper sliding face 24 in the top-to-bottom direction, so that the outer ring 20 is well maintained in a stable posture. Therefore, it is possible to inhibit a deterioration in sealability, which is ascribed to an inclination of the outer ring 20 within the ring groove 120.

The outer ring 20 is entirely coated with diamond-like carbon (DLC) diamond-like carbon (amorphous carbon made up of tetrahedral bond like diamond, having the Vickers hardness ranging from 2000 to 3500 and having high corrosion resistance), which achieves a reduction in abrasion resulting from the sliding movement of the upper and lower sliding faces 24, 25 on the cylinder wall 200 as well as a reduction in abrasion resulting from the repetitive abutment of upper and lower faces 21, 22 of the outer ring 20 on top and bottom faces 121, 122 of the ring groove 120 respectively, and contributes to a substantial enhancement in durability. Instead of diamond-like carbon, other coating materials such as titanium nitride(TiN) and chrome nitride (CrN) may also be used.

The inner ring 30 is made of steel and provided with an abutment. Upper and lower inclined faces 33, 34, which are inwardly inclined upwards and downwards respectively, are formed on the inner diameter-side of the inner ring 30, so that the later-described coil expander 40 can be held at a predetermined position. Because the inner ring 30 is made of steel, the coil expander 40 does not cut thereinto.

As can be seen from the drawing, the inner ring 30 is made to be thin in the radial direction and therefore susceptible to deformation. However, the inner ring 30 which does not have an internal tensile force can directly transmit an elastic force of the coil expander 40 to the outer ring 20.

FIG. 1 shows that the piston 100 is in the process of moving from a bottom dead center position to a top dead center position when the engine is in operation at a high temperature. The piston ring structural body 10 is pressed against the bottom face 122 of the ring groove 120 due to a frictional force acting between the piston ring structural body 10 and the cylinder wall. Conversely, when the piston 100 moves from the top dead center position to the bottom dead center position, the piston ring structural body 10 is pressed against the top face 121 of the ring groove 120.

Due to a construction wherein the piston ring structural body 10 alternately comes into close contact with the top and bottom faces 121, 122 of the ring groove 120, blow-by gas (gas which leak to a crank case through a gap between a piston ring and a cylinder) that tends to flow along a cross-section of the ring groove 120 is sealed.

In addition, it will now be described in detail how the piston ring structural body moves. That is, when the engine is in operation, a downward force is applied to the outer ring 20 due to a friction between the outer ring 20 and the cylinder wall 200 during an upward movement of the piston 100, while an upward force is applied to the outer ring 20 also due to a friction between the outer ring 20 and the cylinder wall 200 during a downward movement of the piston 100. Because the outer ring 20 is in close contact with the inner ring 30, an equal force is applied to both the inner ring 30 and the outer ring 20.

The dimension $B_{in}$ of the inner ring 30 in the piston-axis direction during operation is set smaller than the width H of the ring groove 120 of the piston 100 in the piston-axis direction during operation. Thus, the outer ring 20 and the inner ring 30 integrally reciprocate within the ring groove 120 of the piston 100.

As described above, the height $B_{out}$ of the outer ring 20 in the piston-axis direction during operation is set smaller than the height $B_{in}$ of the inner ring 30 in the piston-axis direction during operation.

Accordingly, during an upward movement of the piston 100, the outer ring 20 is pressed against the bottom face 122 of the ring groove 120. Therefore, when the piston 100 changes its direction of movement from the upward direction to the downward direction, an upper face 31 of the inner ring 30 first hits the top face 121 of the ring groove 120. If a small force is applied upwards, an upper face 21 of the outer ring 20 does not hit the top face 121 of the ring groove 120. Even if the outer ring 20 hits the ring groove 120 due to a large force, the impact made on the ring groove 120 is small. This is because the outer ring 20 hits the ring groove 120 after the inner ring 30 has hit the ring groove 120.

Figure 2:
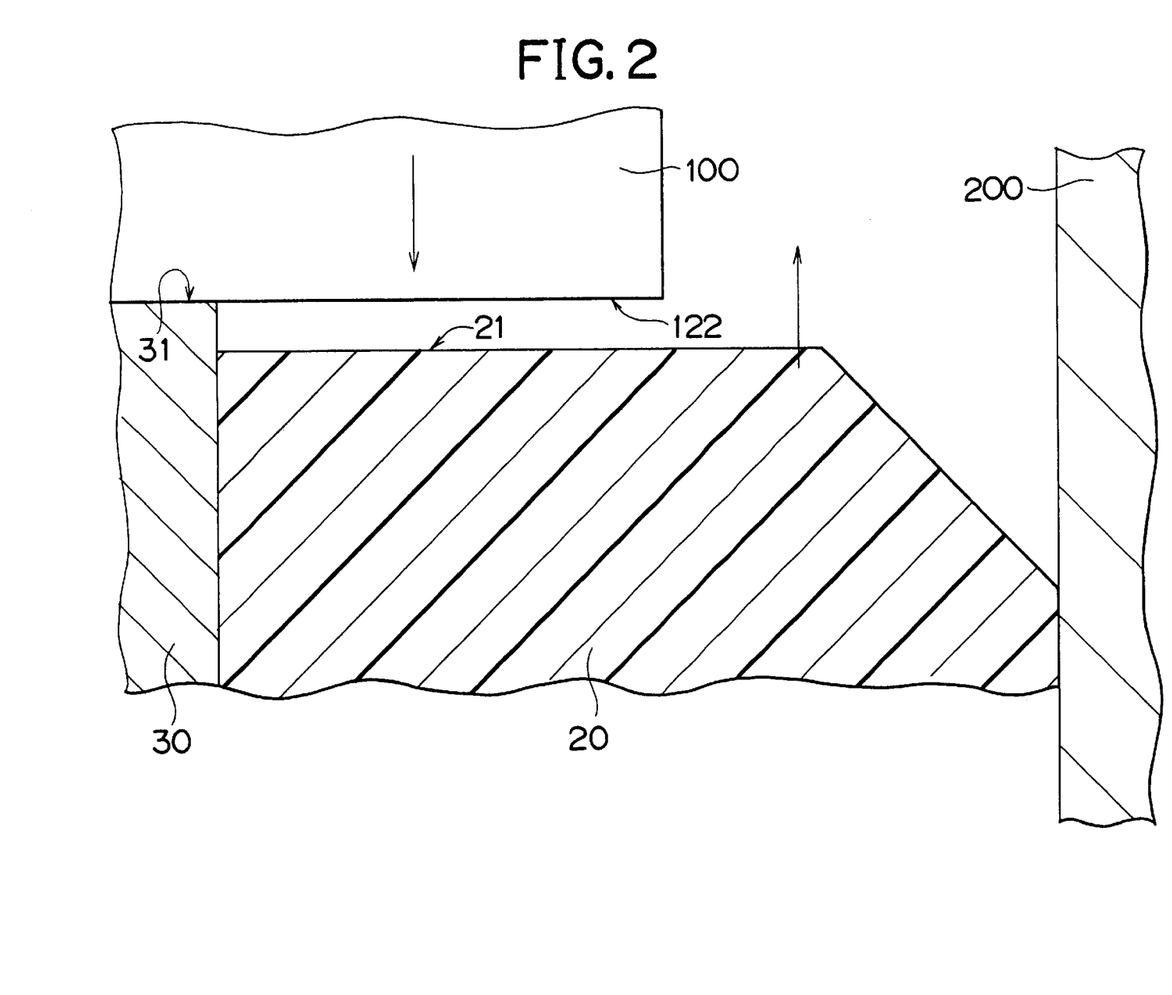
FIG. 2 shows how an inner ring 30 first hits a top face of a ring groove when a piston changes its direction of movement from the upward direction to the downward direction.

To make clear the aforementioned description, FIG. 2 shows a state where the upper face 31 of the inner ring 30 has hit the top face 121 of the ring groove 120 during a downward movement of the piston 100. In this state, the upper face 21 of the outer ring 20 is not in contact with the top face 121 of the ring groove 120.

Equally, the outer ring 20 is pressed against the top face 121 of the ring groove 120 during a downward movement of the piston 100. Therefore, when the piston 100 changes its direction of movement from the downward direction to the upward direction, a lower face 32 of the inner ring 30 first hits the bottom face 122 of the ring groove 120. If a small force is applied downwards, a lower face 22 of the outer ring 20 does not hit the bottom face 122 of the ring groove 120. Even if the outer ring 20 hits the ring groove 120 due to a large force, the impact made on the ring groove 120 is small. This is because the outer ring 20 hits the ring groove 120 after the inner ring 30 has hit the ring groove 120.

Figure 3:
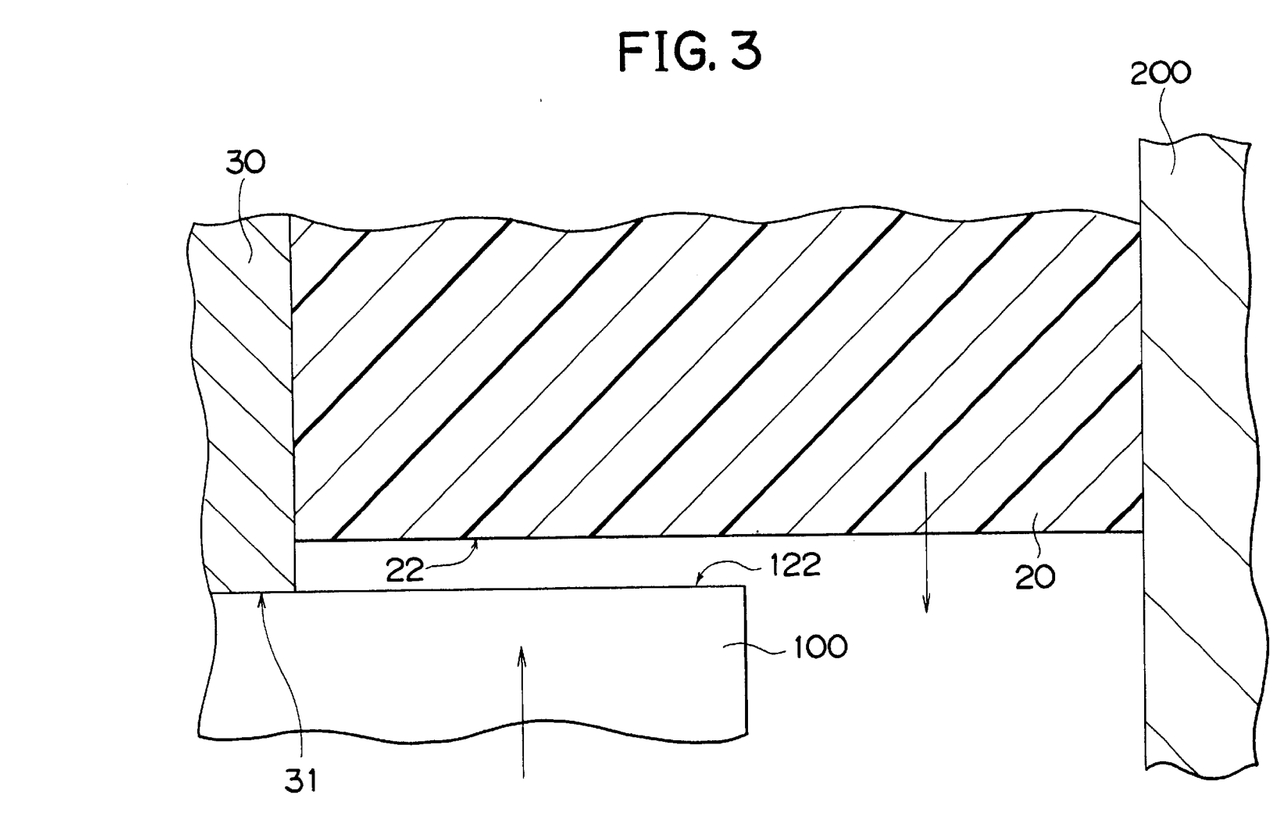
FIG. 3 shows how the inner ring 30 first hits a bottom face of the ring groove when the piston changes its direction of movement from the downward direction to the upward direction.

To make clear the aforementioned description, FIG. 3 shows a state where the lower face 32 of the inner ring 30 has hit the bottom face 122 of the ring groove 120 during an upward movement of the piston 100. In this state, the lower face 22 of the outer ring 20 is not in contact with the bottom face 122 of the ring groove 120.

Consequently, the upper and lower faces 21, 22 of the outer ring 20 are prevented or inhibited from hitting the top and bottom faces 121, 122 respectively, so that the overall durability is enhanced.

The structure of the coil expander 40 will now be described. The coil expander 40 has a known structure wherein a steel coil 41, which is made by winding a steel wire of a circular cross-section like a coil, has a core member 42 passing therethrough and is bent into a circular shape along the core member 42. The steel coil 41 and the core member 42 are provided with abutments respectively. The coil expander 40 is disposed to be received between the aforementioned upper and lower inclined faces 33, 34 of the inner ring 30. By being thus received, the coil expander 40 becomes shorter. Accordingly, the coil expander 40 attempts to assume its free length and thereby generates such a force as to stretch the inner ring 30 outwards.

A method of mounting the thus-constructed outer ring 20, inner ring 30 and coil expander 40 into the second ring groove 120, which is located at the second closest position to the top portion of the piston 100, will now be described.

In a first step, the coil expander 40 is fitted into the ring groove 120. This step is carried out such that the abutment portions of the steel coil 41 and the core member 42 are made to coincide with each other in the circumferential direction and that the coil expander 40 is fitted into the ring groove while simultaneously stretching out those abutment portions.

Then, the inner ring 30 is fitted into the ring groove. In this case, because the inner diameter of the inner ring 30 is smaller than the outer diameter of the piston 100, it is necessary to fit the inner ring 30 into the ring groove while enlarging the diameter thereof.

Figure 4:
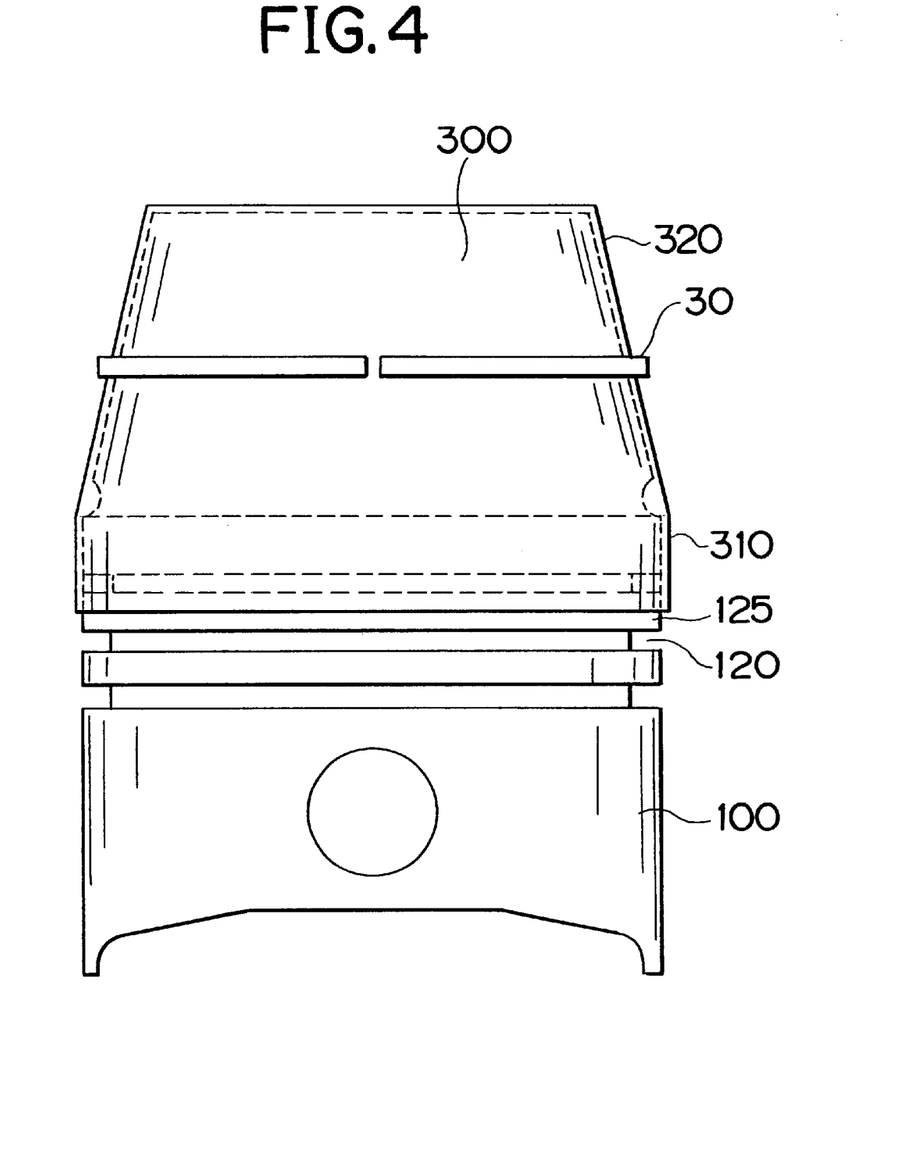
FIG. 4 shows the structure of a ring guide.

Accordingly, as a second step, a fitting operation of a ring guide 300 is carried out. The ring guide 300 is a jig for fitting the inner ring 30 into the ring groove 120 while enlarging the inner ring 30.

FIG. 4 shows a state where the ring guide 300 is attached to the piston 100. As shown in the drawing, the ring guide 300 is composed of a cylindrical portion 310 and a truncated cone portion 320. The cylindrical portion 310 has such an inner diameter that the cylindrical portion 310 can be fitted onto the outer periphery of the piston 100. The cylindrical portion 310 has such a depth that when covering the piston 100 from the top portion thereof, the lower end of the cylindrical portion 310 is located at the center of a second land 125, which is located immediately above the second ring groove 120 into which the inner ring 30 is fitted.

On the other hand, the top portion of the truncated cone portion 320 has such an outer diameter that the inner ring 30 is easily fitted onto the truncated cone portion 320. The outer diameter of the lower end portion of the truncated cone portion 320 is equal to that of the cylindrical portion 310.

The smaller the enlargement amount of the inner ring 30 is, the easier the fitting operation becomes. Thus, the thinner the ring guide 300 is, the better.

In a third step, the thus-fitted ring guide 300 is used to fit the inner ring 30 into the second ring groove.

Figure 5:
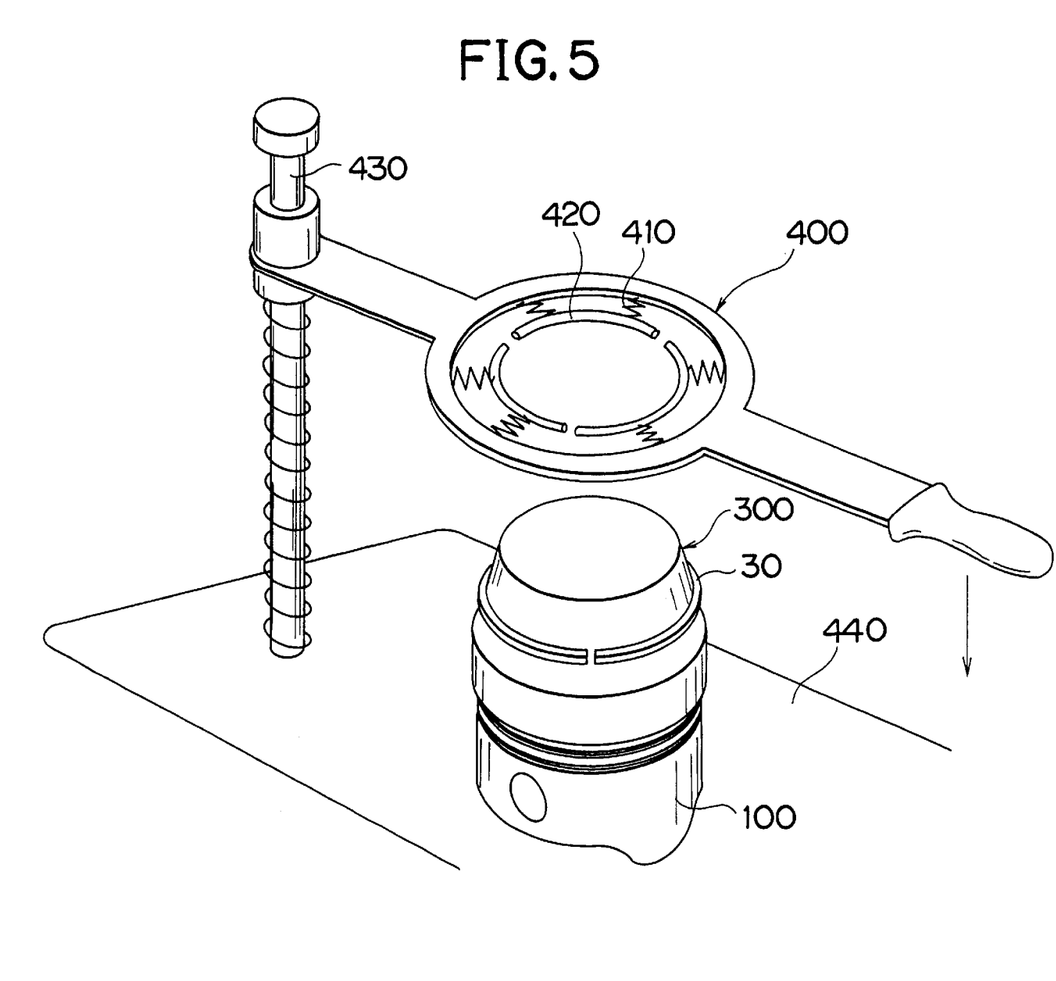
FIG. 5 shows the structure of a ring-forcing jig.

This step is carried out using, for example, a ring-forcing jig 400 as shown in FIG. 5. The ring-forcing jig 400 causes three radially movable ring pieces 420 that are suitably supported by springs 410 to reciprocate along a column 430. In a free state, the inner diameter of a circle composed of the three ring pieces 420 is larger than the outer diameter of the top portion of the truncated cone portion 320 of the ring guide 300, which is fitted onto the piston 100 that is suitably secured onto a work bench 440. When the inner ring 30 is forcibly fitted onto the ring guide 300, the inner ring 30 can be enlarged until the inner diameter thereof becomes equal to the outer diameter of the cylindrical portion 320 of the ring guide 300.

The ring-forcing jig shown in the drawing is merely an example. Any type of jig can be used as long as it can forcibly fit the inner ring onto the ring guide as described above.

In a fourth step, the outer ring 20 is fitted onto the thus-fitted inner ring 30.

The thus-fitted inner ring 30 is pressed outwards due to an elastic force of the coil expander 40, so that the inner ring 30 projects from the ring groove 120. Therefore, in the fourth step, the inner ring 30 is first forced inwards to ensure that it does not project from the ring groove 120, and the fitting operation of the outer ring 20 is then carried out.

Figure 6:
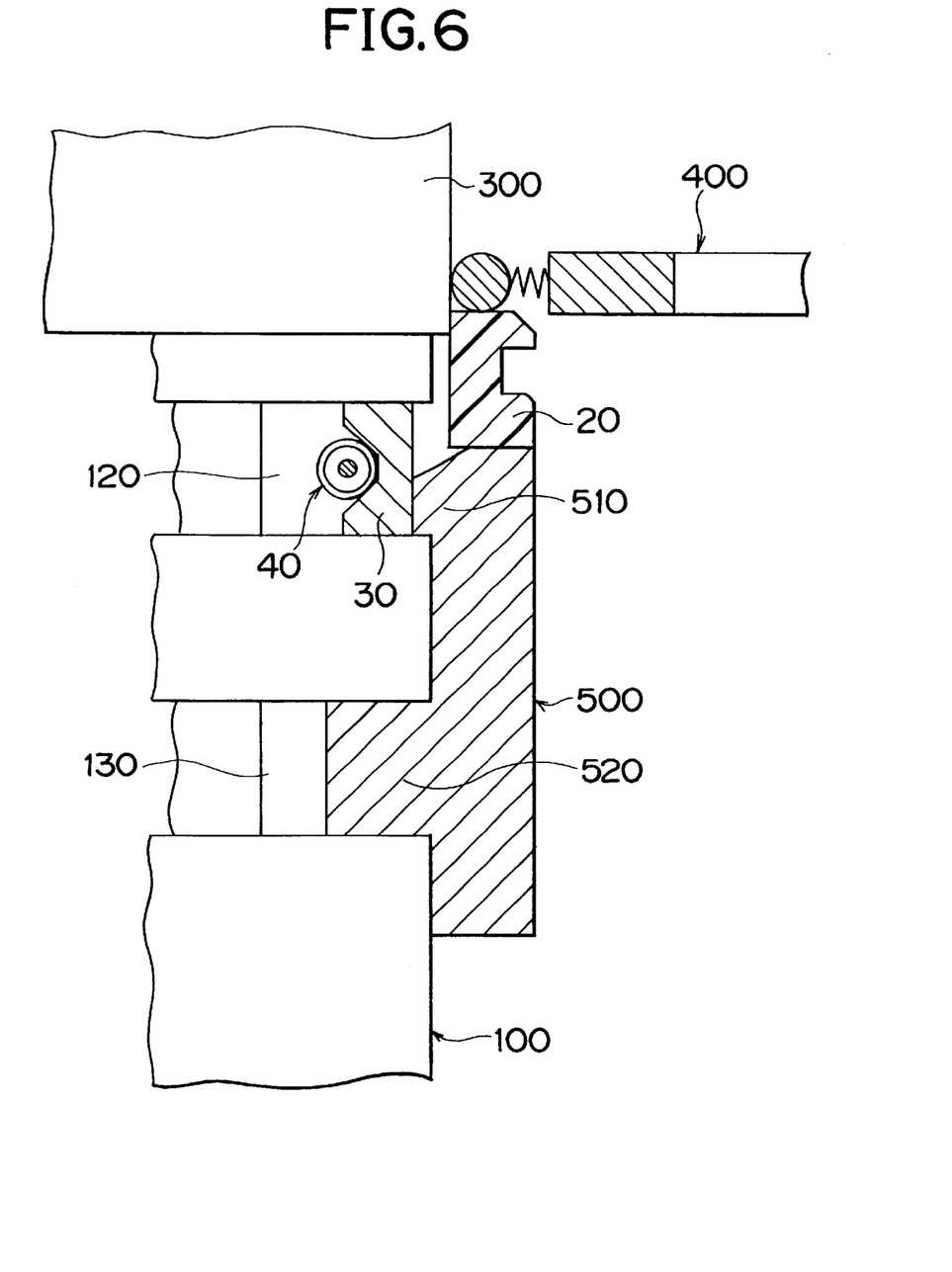
FIG. 6 shows the structure of an inner ring pressing jig.

FIG. 6 is a view from a direction perpendicular to the axis of the piston 100, showing how the inner ring 30 is pressed inwards. Referring to FIG. 6, an inner ring pressing jig 500 is divided into two portions when viewed from the piston-axis direction. The inner ring pressing jig 500 has an inner ring pressing portion 510 for pressing the inner ring 30 and a positioning portion 520 for positioning the inner ring pressing portion 510 at a predetermined position. The positioning portion 520 is tightly fitted into an oil ring groove 130, which is located below the second ring groove 120 into which the inner ring 30 is fitted. The inner ring pressing portion 510 presses the inner ring 30 inwards such that the outermost portion of the inner ring 30 is located inwardly of the outer circumference of the piston 100 when the positioning portion 520 is tightly fitted into the oil ring groove 130.

As described above, in a state where the inner ring 30 is pressed inwards beyond the outer circumference of the piston 100, the outer ring 20 is pressed downwards using the ring guide 300 and the ring-forcing jig 400. When the outer ring 20 comes into contact with an upper face 510 of the inner ring pressing jig 500, the inner ring pressing jig 500 is removed. Thereafter, the outer ring 20 is pressed further downwards using the ring-forcing jig 400 until the outer ring 20 is fitted onto the inner ring 30.

By carrying out the thus-described first through fourth steps, the piston ring structural body 10 can be fitted into the second ring groove 120 of the piston 100 easily and reliably. The piston ring structural body 10 has a construction wherein the steel coil expander 40 presses the outer ring 20 continuously formed of polyimide radially outwards via the metal inner ring 30, the outer ring 20 not being provided with an abutment and the inner ring 30 being provided with an abutment.

In pressing the inner ring 30 using the inner ring pressing portion 510, if the inner ring 30 is pressed at a lower position which is offset downwards from the center of the coil expander 40, the upper portion of the inner ring 30 may undergo such a torsional deformation as to project from the outer contour of the piston due to an elastic force of the coil expander 40. Thereby, it may become difficult to tightly fit the outer ring 20 onto the inner ring 30. Conversely, even in the case where the inner ring 30 can be pressed at a position corresponding to the elastic center of the coil expander 40, if the amount of the outer ring 20 fitted onto the inner ring 30 is small, it may become difficult to fit the outer ring 20 onto the inner ring 30.

Figure 7:
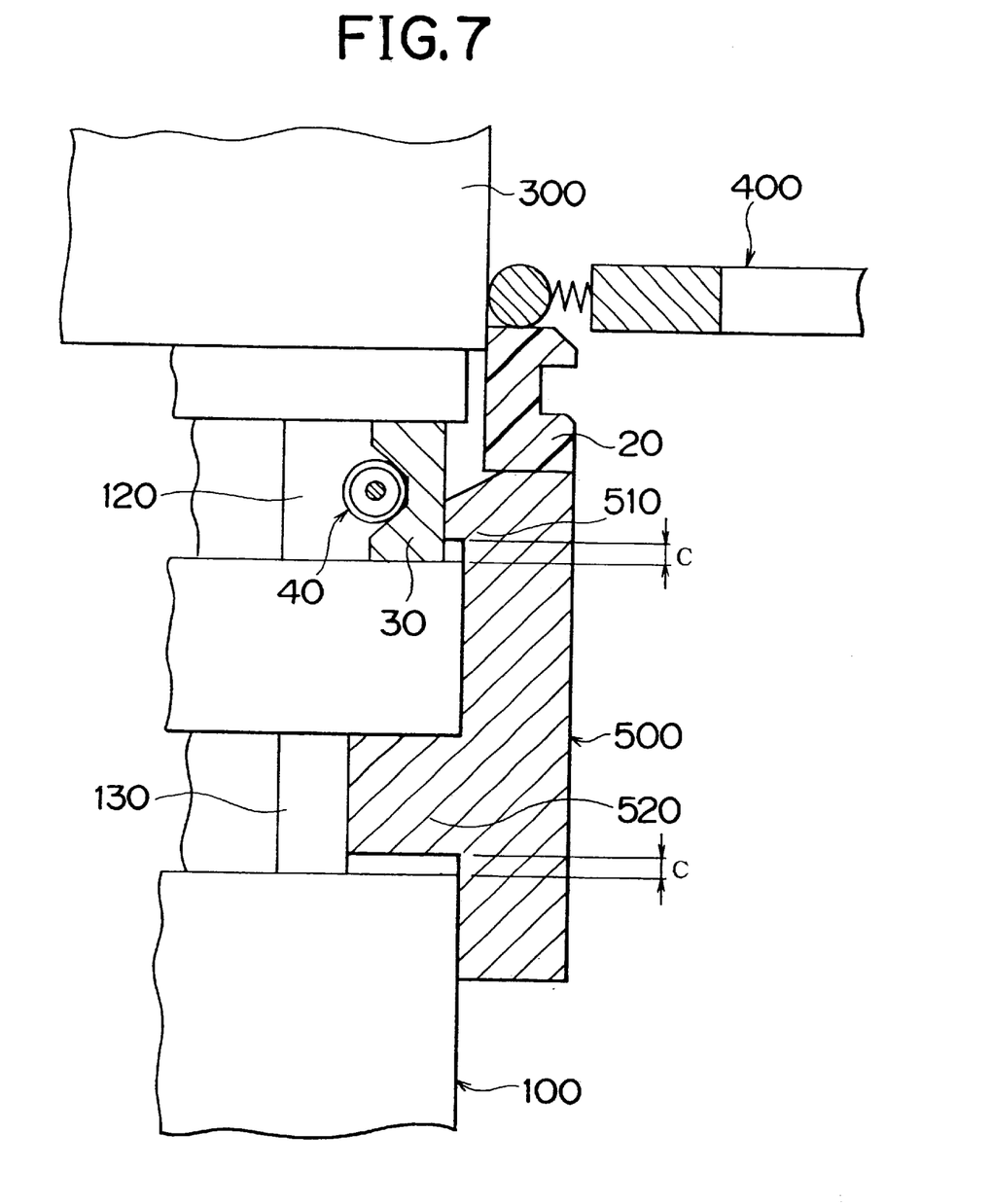
FIG. 7 shows the structure of a variation of the inner ring pressing jig.

Hence, as shown in FIG. 7, a predetermined gap C in the piston-axis direction is formed between the ring groove of the piston and each of the inner ring pressing portion 510 and the positioning portion 520 of the inner ring pressing jig 500. Thus, the inner ring pressing jig 500 can be displaced in the piston-axis direction relative to the piston by the predetermined gap C.

During the fitting operation of the outer ring 20, the inner ring pressing portion 510 of the inner ring pressing jig 500 can press the inner ring 30 at a position close to the elastic center of the coil expander 40, whereby it is possible to prevent torsional deformation of the inner ring 30. Furthermore, if the inner ring pressing jig 500 is pressed downwards by a predetermined amount in a state where the outer ring 20 abuts on the upper face 510 of the inner ring pressing jig 500, it is possible to increase the amount of the outer ring fitted onto the inner ring 30. As a result, it is possible to reliably fit the outer ring 20 onto the inner ring 30.

A second embodiment of the present invention will now be described.

Figure 8:
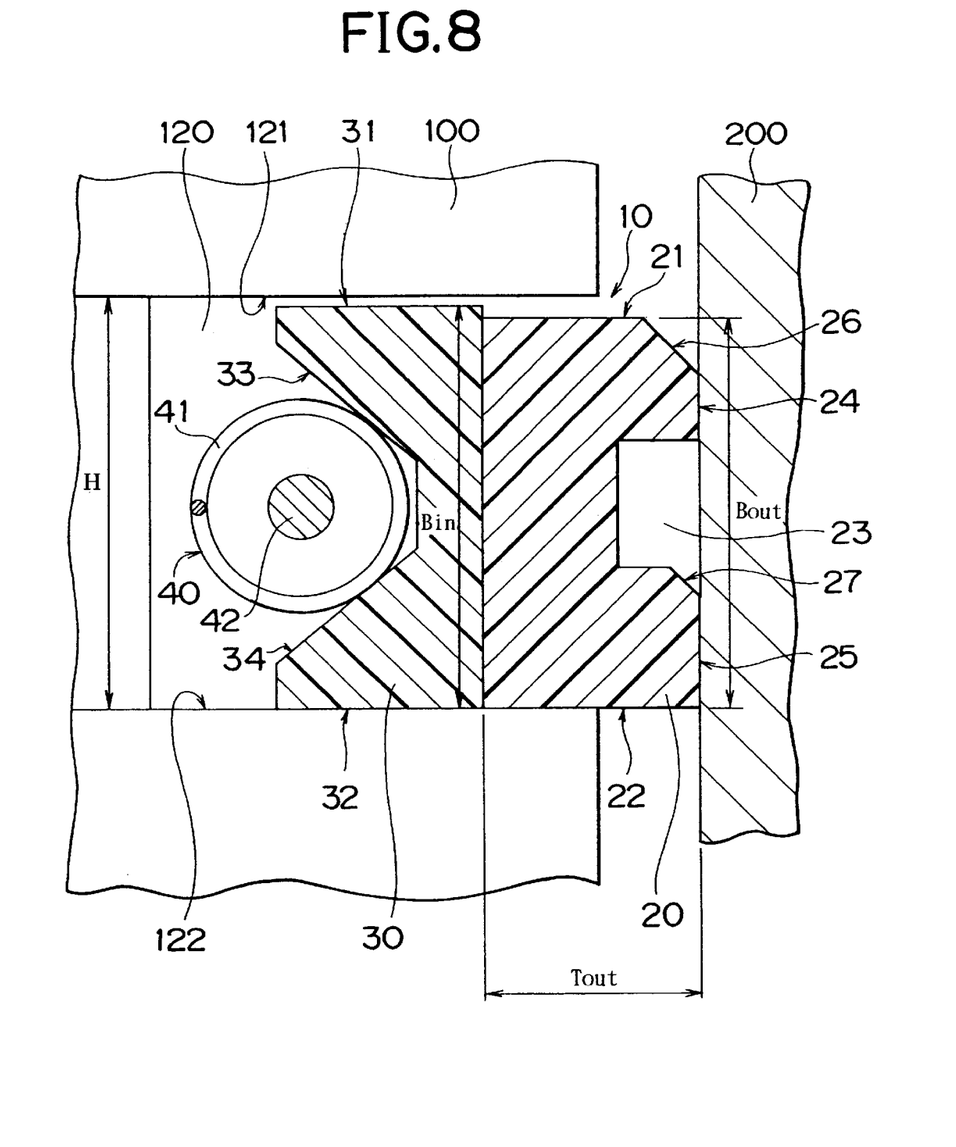
FIG. 8 shows a sealing structure according to a second embodiment of the present invention.

FIG. 8 shows the second embodiment in the same manner as in FIG. 1. As is the case with the first embodiment, the second embodiment also employs the outer ring 20 made of polyimide. However, the second embodiment is different from the first embodiment in that the outer ring 20 is provided with an abutment 28 and the inner ring 30 is made of fiber-reinforced polyimide.

Figure 9:
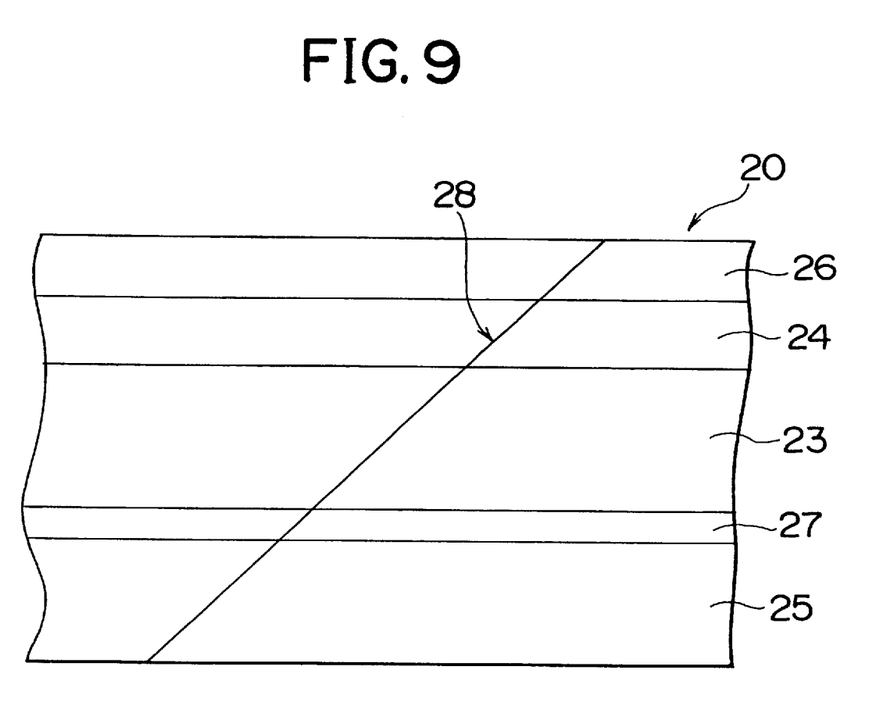
FIG. 9 shows abutment portions that have been formed by obliquely cutting an outer ring 20 according to a second embodiment of the present invention.

The abutment 28 of the outer ring 20 is formed by obliquely cutting an endless material that has been transformed into a perfectly round circle at a room temperature. Because the outer ring 20 is transformed into a substantially round circle during operation, it is obliquely cut at a room temperature so as to prevent the abutment 28 from being accompanied by a gap during operation. FIG. 9 shows the abutment 28, which has been formed by cutting the outer ring 20 at a room temperature when the outer ring 20 is in the shape of a perfectly round circle.

In the second embodiment, the height $B_{out}$ of the outer ring 20 in the piston-axis direction during operation is set smaller than the width H of the ring groove 120 of the piston 100 in the piston-axis direction during operation.

Figure 10:
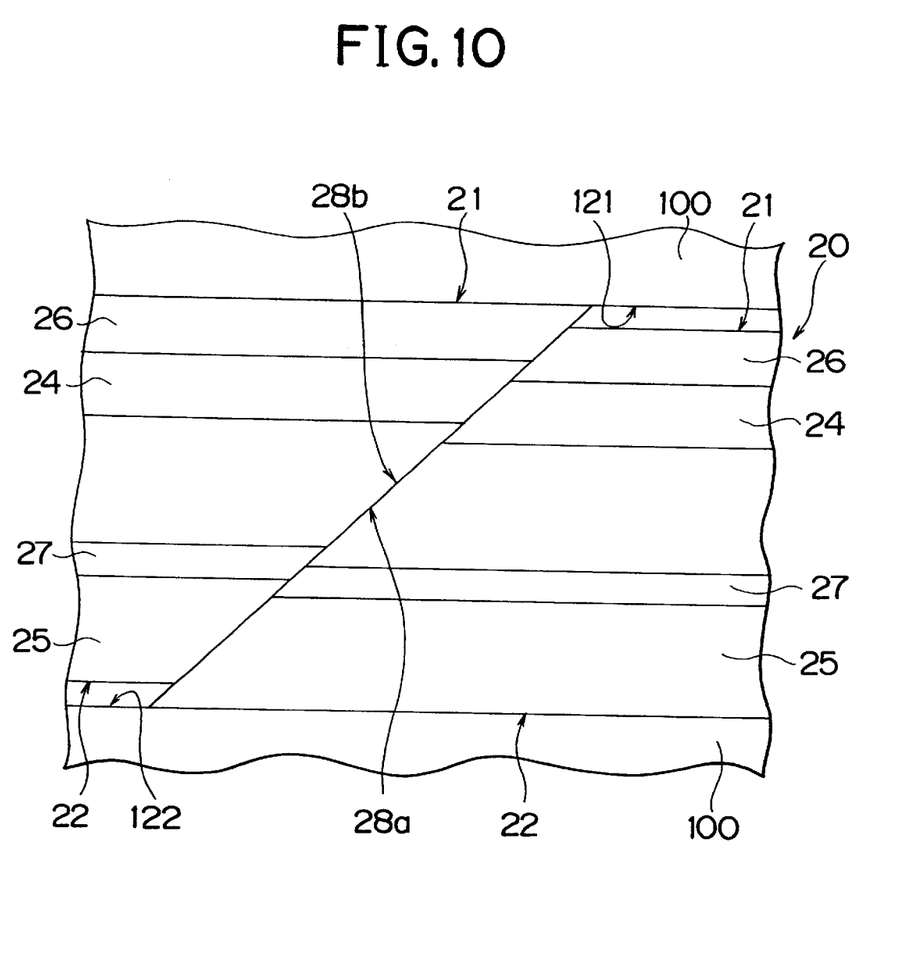
FIG. 10 shows the outer ring 20 shown in FIG. 9 during operation.

FIG. 10 shows the abutment 28 during operation. Although the outer ring 20 thermally expands during operation, the obliquely formed abutment 28 functions such that opposed end faces 28a, 28b thereof are pushed onto and displaced relative to each other.

Consequently, the end faces 28a, 28b can be displaced relative to each other until an upper corner portion of the end face 28a comes into contact with the top face 121 of the ring groove 120 of the piston 100 and a lower corner portion of the end face 28b comes into contact with the bottom face 122 of the ring groove 120 of the piston 100. However, even in this state, the end faces 28a, 28b are mostly in close contact with each other, so that there is no gap extending from the upper face to the lower face of the outer ring 20.

Because the outer ring 20 of the second embodiment is provided with the abutment 28, it is possible to fit the outer ring 20 into the ring groove 120 without using the jig as described in relation to the first embodiment.

On the other hand, because the inner ring 30 is made of fiber-reinforced polyimide resin, it is light of weight and reduces the inertia force during operation. Thus, the threshold engine speed at which the inner ring 30 is lifted from the bottom face 122 of the ring groove during operation increases, whereby it is possible to reduce the amount of blow-by gas generated due to a lift of the inner ring 30 to an extent sufficient for practical use. In the case where the inner ring 30 is made of metal, a precision machining process should be conducted after a material having a special cross-sectional shape has been formed. However, in the case where the inner ring 30 is made of metal as in the second embodiment, it can be formed at a time using a suitable casting method, which substantially reduces or even eliminates the necessity to conduct a machining process.

According to the exemplary descriptions of both the first and second embodiments, the piston ring structural body 10 is used as a second ring that is fitted into the second ring groove, which is located at the second closest position to the top portion of the piston. However, the piston ring structural body 10 can also be used as a ring other than the second ring, for example, a sealing ring of the piston.

In the aforementioned embodiments, it is possible to obtain the piston ring structural body, which has a construction wherein the outer ring made of polyimide is pressed outwards in the radial direction of the piston by the coil expander via the metal inner ring provided with an abutment, in the ring groove of the piston. The outer ring is unlikely to be deformed even at a high temperature. In addition, the outer ring smoothly slides against the cylinder wall without causing any damage to the sealability between itself and the cylinder wall, and exhibits high durability. The inner ring, which is also made of metal, exhibits high durability, because the coil expander does not cut thereinto.

In the case where, the outer ring of the aforementioned embodiments is continuously formed, it can be manufactured at a lower cost. In the case where the outer ring is provided with an abutment, the fitting operation thereof can be carried out with ease.

In the aforementioned embodiments, at least the lower face of the outer ring is coated with titanium nitride, chrome nitride or diamond-like carbon, which leads to an enhancement in durability of the lower face of the outer ring.

Furthermore, according to the aforementioned mounting method, it is possible to fit the piston ring structural body, which has a construction wherein the outer ring made of polyimide without being provided with an abutment is pressed outwards in the radial direction of the piston by urging means via the metal inner ring provided with an abutment, into the ring groove of the piston easily and reliably.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within spirit and scope of the present invention.

What is claimed is:

1. A sealing structure that is disposed in a groove formed in one of opposed sliding faces of a piston and a cylinder that are in sliding contact with each other and is urged toward and brought into sliding contact with the other sliding face where no groove is formed, wherein said sealing structure is a piston ring disposed within a piston ring groove formed in a piston for an internal combustion engine, the sealing structure comprising:
    a sealing member composed of a plurality of radially laminated rings; and
    urging means for urging the sealing member toward a side where no groove is formed,
    wherein a sliding-contact ring of said sealing member is disposed on a side most remote from said urging means and contains said sliding-contact face,
    wherein an urging force recieving ring of said sealing member is adjacent to said urging means and receives an urging force of said urging means, and
    wherein said sliding-contact ring is made of polymide resin and said urging force receiving ring is provided with an abutment and made of a material that has a hardness greater than polymide resin.

2. The sealing structure according to claim 1,
    wherein said sealing member is a double-structure ring composed of an outer ring serving as the sliding-contact ring disposed on the side nearest to the cylinder and an inner ring serving as the urging force receiving ring disposed on the side nearest to the piston.

3. The sealing structure according to claim 2, wherein said outer ring is continuously formed without being provided with an abutment.

4. The sealing structure according to claim 2, wherein said outer ring is provided with an abutment.

5. The sealing structure according to claim 4,
    wherein the abutment of the outer ring is an inclined abutment formed by cutting the outer ring when the outer ring is in a shape of a perfectly round circle at room temperature, and
    wherein a width of the outer ring in a piston-axis direction during operation is set smaller than a width of a groove of the piston in the piston-axis direction during operation.

6. The sealing structure according to claim 2,
    wherein a width of the outer ring in a piston-axis direction during operation is set smaller than a width of the inner ring in the piston-axis direction during operation, and
    wherein a width of the inner ring in the piston-axis direction during operation is set smaller than a width of a ring groove of the piston in the piston-axis direction during operation.

7. The sealing structure according to claim 2, wherein at least a lower face of said outer ring is coated with any one of titanium nitride, chrome nitride and diamond-like carbon.

8. The piston ring structural body according to claim 2,
    wherein at least an outer sliding face of said outer ring that is in sliding contact with a cylinder wall is coated with one of titanium nitride, chrome nitride and diamond-like carbon.

9. The sealing structure according to claim 2,
    wherein an outer sliding face of the outer ring is divided in a top-to-bottom direction, and
    wherein at least an upper edge of a sliding face that is closest to a top position is provided with a chamfer.

10. The piston ring structural body according to claim 9,
    wherein sliding faces, which are formed by dividing the outer sliding face of said outer ring, are provided with chamfers at respective upper edges thereof, said chamfers being different in size.

11. The piston ring structural body according to claim 9,
    wherein the lower sliding face, which is formed by dividing the outer sliding face of said outer ring, is provided with a chamfer at an upper edge thereof,
    wherein the chamfer of said upper sliding face is larger than the chamfer of said lower sliding face, and
    wherein said upper sliding face is narrower than said lower sliding face in the top-to-bottom direction.

12. The sealing structure according to claim 2,
    wherein said inner ring is made of a metal, and
    wherein said urging means is a coil expander, which is a member composed of a metal wire wound like a coil.

13. The sealing structure according to claim 2,
    wherein said inner ring is made of a reinforced polyimide resin, and
    wherein said urging means is a coil expander, which is a member composed of a metal wire wound like a coil.

14. A method of mounting the piston ring structural body according to claim 1, comprising the steps of:
    fitting urging means into a piston ring groove;
    covering the piston from a top side thereof with a ring guide having a truncated cone portion that is enlarged toward a cylindrical portion adapted to an outer circumference of the piston, such that a lower end of the cylindrical portion is located close to a center of a land that is located immediately above said piston ring groove;
    fitting the inner ring into the piston ring groove, using the truncated cone portion of said ring guide; and
    fitting the outer ring, which is continuously formed of polyimide without being provided with an abutment, into the piston ring groove, using the truncated cone portion of said ring guide, in a state where the inner ring thus-fitted into the piston ring groove and pressed radially outwards by the urging means is pressed radially inwards by an inner ring pressing jig so as to prevent an outermost portion of the inner ring from projecting from the piston ring groove.

15. The method according to claim 14, wherein said inner ring pressing jig defines a pressing portion for pressing the inner ring radially inwards and a fit portion that is fitted into another ring groove to be positioned therein.

* * * * *